Nov. 15, 1966  I. S. HOUVENER  3,285,633
FASTENER
Filed Oct. 30, 1963

INVENTOR.
Irving S. Houvener
BY
AGENT

United States Patent Office 3,285,633
Patented Nov. 15, 1966

3,285,633
FASTENER
Irving S. Houvener, Midland, Mich., assignor to The Dow Chemical Company, Midland, Mich., a corporation of Delaware
Filed Oct. 30, 1963, Ser. No. 320,164
5 Claims. (Cl. 287—20.92)

This invention relates to fasteners. It more particularly relates to a fastener particularly adapted for joining panels in edge to edge relationship.

Many structures are fabricated utilizing sandwich panels which comprise a core of a low strength material and skins or face sheets of a high strength material. Such panels advantageously are often utilized for structures or enclosures which are designed to have a relatively high temperature differential existing between the inner and outer surfaces such as cold storage rooms and the like. Oftentimes these structures are built utilizing a supporting framework to which the panels are attached. Frequently they are joined together by means of cap strips and oftentimes spline members are incorporated in the edge portions of the panels to effect a joint. Much difficulty has been encountered in providing suitable fasteners for such panels, particularly fasteners which are readily installed at a point of manufacture and can readily survive shipping, handling, and final erection. Oftentimes for sanitary reasons it is desirable that such fasteners should not provide recesses or crevices in which dirt can lodge and for safety purposes they could not protrude from the panels being joined. Such fasteners conveniently should provide a means of aligning adjacent panels with each other and draw them together to form a right joint.

It is an object of this invention to provide an improved fastener for panels.

It is another object of this invention to provide an improved fastener particularly suited for use with sandwich panels.

Another object of the invention is to provide an improved fastener for panels which results in a flush joint with no protruding hardware.

A further object of the invention is to provide a fastener which is readily sealed to prevent access of dirt and foreign matter.

These objects and other benefits and advantages in accordance with the present invention are readily achieved with a fastener comprising two portion, each portion having a skin engaging portion, each of said portions being so constructed and arranged that when placed in edge to edge mating relationship they define a recess, said recess having disposed therein a protrusion, said protrusion having an exterior tapering surface, said surface, if projected, tapering toward a location remote from and opposite to the convex side of the fastener, said conical protrusion defining a centrally disposed aperture adapted to receive a collar having an internal tapering surface adapted to mate with the conical protrusion, means to secure and maintain the collar is mating engagement with the protrusion.

Further features and advantages of the invention will become apparent from the following specification when taken in connection with the drawing wherein.

Figure 1:
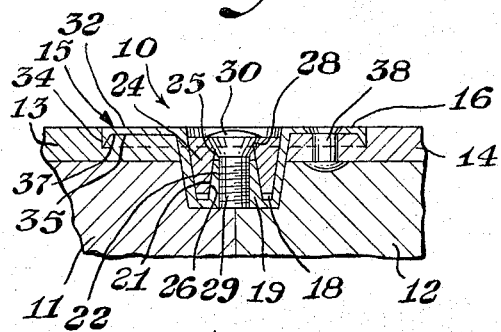
FIGURE 1 shows a sectional view of a fastener in accordance with the invention securing two panels together.

In FIGURE 1 there is illustrated a sectional view of a connector generally designated by the reference numeral 10 joining two sandwich panels 11 and 12 having skins or face sheets 13 and 14. The connector 10 comprises two mating portions 15 and 16. The portions 15 and 16 jointly define a cavity 18 having disposed therein a tapering protuberance or boss 19. The boss 19 has an external tapering face 21 and defines an aperture 22. The face 21 tapers toward a point lying on the concave side of the fastener. A mating collar 24 is disposed within the cavity 18, the collar 24 has a generally annular configuration and an internal passageway 25 having a tapering face 26 adapted to engage the tapering face 21 of the boss 19. The passageway 25 is countersunk to provide a second tapering face 28. Disposed partially within the passageways 22 and 25 is a retaining means or screw 29 having a head 30. The head 30 of the screw 29 rests against the countersunk portion 28 of the passageway 25. The connector portion 15 is provided with a support engaging flange 32 having peripherally disposed thereabout a flange 34. The flange 32 has a sheet engaging face 35 disposed on the convex side of the fastener. An adhesive layer 37 secures the fastener portion 15 to the face sheet 13. The fastener portion 16 is secured to the face sheet 14 by means of the rivet 38.

Figure 2:
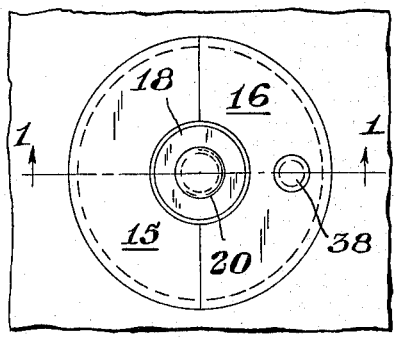
FIGURE 2 shows a plan view of a portion of a fastener in accordance with the invention.

FIGURE 2 depicts a plan view of the fastener portions 15 and 16 illustrating their mating configuration and the location of the recess 18, the aperture 20, and the tapering surface 21.

In assembly of the embodiment of the invention illustrated in FIGURE 1 the fastener portions 15 and 16 are secured to the panel by any desired means such as adhesives, riveting, or the like, after the portions of the panels have been suitably counterbored to receive them, or alternately they may be affixed to the skin prior to lamination of the skin to the core material. The two panels to be joined are then positioned in such a manner that the mating halves of the fasteners are in alignment to define the recess of cavity 18. The tapered plug 24 is placed within the cavity. If alignment of the two parts is not perfect, the tapered collar 24 may be forced into the cavity by means of the screw 30 or by means of any auxiliary means such as a drift or the like.

Figure 3:
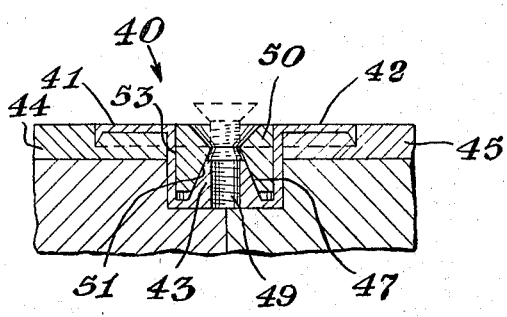
FIGURE 3 depicts an alternate embodiment of the invention.

In FIGURE 3 there is illustrated an alternate fastener 40 in accordance with the invention comprising fastener portions 41 and 42 which are secured to the face sheets 44 and 45. The fastener portions 41 and 42 define a boss 43 having an external tapered surface 47 and a centrally disposed aperture 49. A collar 50 having a mating internal tapered surface 51 is in engagement with the surface 47 of the boss 43. The surface 53 of the collar 50 is generally cylindrical in configuration and adapted to closely engage the adjacent surfaces of the fastener portions 41 and 42.

The embodiment of the invention illustrated in FIGURE 3 is particularly advantageous when the panels or skin portions such as 44 and 45 exhibit a tendency to change dimension and exert pressure on the fastener and eject it from the panel. The utilization of the generally cylindrical sided plug and the corresponding configuration of the fastener portions prevents any significant component force appearing in a direction normal to the panel surfaces. Further, such a configuration is particularly desirable when a flush surface is desired which need not be filled with a sealant or sealing compound.

Figure 4:
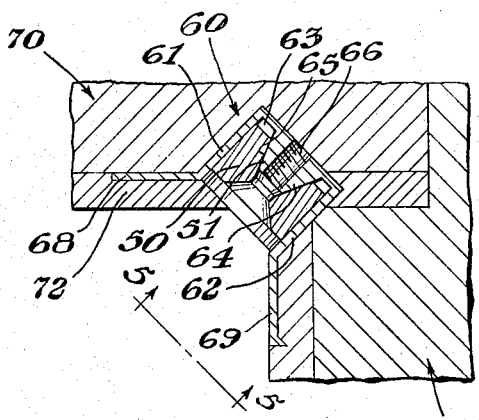
FIGURE 4 depicts a cross sectional view of a corner joint employing a fastener.

In FIGURE 4 there is illustrated an alternate fastener in accordance with the invention generally designated by the reference numeral 60. The fastener 60 comprises fastener portion 61 and 62 which together define a cavity 63 and a boss 64. The boss 64 has a tapering or conical surface 65. The boss 64 defines the centrally disposed aperture 66. A retaining collar 50, having a mating tapered surface 51 is in engagement with the surface 65 of the boss 64. The fastener portion 61 is provided with a panel engaging flange 68 and the portion 62 is provided with a panel engaging portion 69.

Figure 5:
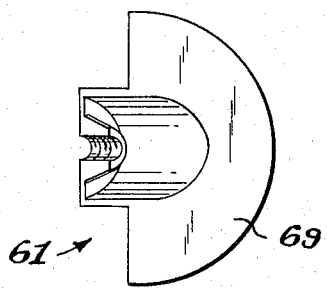
FIGURE 5 depicts a view of a portion of the fastener of FIGURE 4.

FIGURE 5 depicts a view of the fastener portion 61 showing the relationship between the cavity forming portion and the panel engaging flange 69. The fastener 60 is illustrated joining panels 70 and 71 which have face sheets 72 and 73 and cores 74 and 75, respectively.

Operation of the fastener in FIGURE 4 is substantially identical to that illustrated in FIGURE 3 with the exception that the retaining flanges are disposed within the panel rather than on the surface thereof. This feature provides a protection of the fastener from corrosive atmosphere or mechanical distortion by the contact of heavy objects with the exterior surface of the panel.

The fasteners in accordance with the invention are illustrated as being secured with a screw member. However, if the permanent non-demountable installations are to be made a rivet is equally suitable and oftentimes adhesives such as the epoxy resins and the like are employed with equal benefit.

The fasteners of the present invention are readily sealed by the use of tapes, mastic and the like placed over or in the fasteners.

As is apparent from the foregoing specification, the manufacture of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

I claim:

1. A fastener comprising two portions each portion having a skin engaging side and each portion of the fastener being so constructed and arranged that when placed in edge to edge mating relationship the portions define a recess,
    said recess having disposed therein a protrusion, the protrusion being formed by a part of each of the fastener portions,
    said protrusion having an exterior tapering surface, the surface tapering toward a location remote from and opposite to the skin engaging side of the fastener,
    a collar having an internal tapering surface mating with at least a portion of the tapering surface of the protrusion, the collar entering the recess, and
    means to secure and maintain the collar in mating engagement with the protrusion.

2. The fastener of claim 1 wherein the fastener has a generally circular configuration wherein the periphery of the fastener has a generally circular configuration.

3. The fastener of claim 1 including a dependent flange positioned on the skin engaging side, the flange depending toward the skin engaging side of the fastener.

4. The fastener of claim 1 wherein the collar is retained on the protrusion by a threaded retaining means adapted to engage an internally threaded aperture within the protrusion.

5. A fastener particularly adapted for the joining of sandwich panels;
    said fastener having a concave side and a convex side comprising
    a pair of body portions
    each of said body portions having one generally linear mating edge, said fastener so constructed and arranged that when the body portions are placed in edge to edge mating relationship
    a generally annular concave recess is formed within a protrusion disposed within the recess, the protrusion having a generally conical configuration and tapering toward the concave side of the fastener, said protrusion being formed by a part of each of the fastener portions,
    a collar adapted to be positioned within the recess and having an internal tapering surface adapted to mate with the tapering surface of the protrusion and maintain the fastener portions in engagement with each other
    said protrusion defining an internally threaded aperture, and
    an externally threaded member adapted to engage the internally threaded aperture and retain the collar in mating relationship with the protrusion.

References Cited by the Examiner

FOREIGN PATENTS 192,552   2/1923   Great Britain.

HARRISON R. MOSELEY, *Primary Examiner.*

A. I. BREIER, *Assistant Examiner.*